US011390346B2

(12) United States Patent
Grassi

(10) Patent No.: US 11,390,346 B2
(45) Date of Patent: Jul. 19, 2022

(54) SHAFT MINIMIZING ELLIPTICALIZATION STRAIN ERROR

(71) Applicant: Michael Grassi, Columbus, OH (US)

(72) Inventor: Michael Grassi, Columbus, OH (US)

(*) Notice: Subject to any disclaimer, the term of this patent is extended or adjusted under 35 U.S.C. 154(b) by 0 days.

(21) Appl. No.: 16/966,447

(22) PCT Filed: Jan. 25, 2019

(86) PCT No.: PCT/US2019/015299
§ 371 (c)(1),
(2) Date: Jul. 30, 2020

(87) PCT Pub. No.: WO2019/148045
PCT Pub. Date: Aug. 1, 2019

(65) Prior Publication Data
US 2021/0070392 A1 Mar. 11, 2021

Related U.S. Application Data

(60) Provisional application No. 62/732,356, filed on Sep. 17, 2018, provisional application No. 62/622,627, filed on Jan. 26, 2018.

(51) Int. Cl.
G06F 11/30 (2006.01)
B62J 45/411 (2020.01)
B62J 45/41 (2020.01)
B62M 3/00 (2006.01)
B62M 3/16 (2006.01)
F16C 3/02 (2006.01)
F16D 3/06 (2006.01)
(Continued)

(52) U.S. Cl.
CPC ............. *B62J 45/411* (2020.02); *B62J 45/41* (2020.02); *B62J 45/421* (2020.02); *B62M 3/00* (2013.01); *B62M 3/16* (2013.01); *F16C 3/02* (2013.01); *F16C 3/026* (2013.01); *F16D 3/06* (2013.01); *F16D 3/065* (2013.01); *G01L 3/108* (2013.01); *F16C 2202/02* (2013.01); *F16C 2204/20* (2013.01); *F16C 2204/26* (2013.01); *F16C 2204/42* (2013.01); *F16C 2204/60* (2013.01); *F16C 2206/02* (2013.01); *F16C 2326/28* (2013.01)

(58) Field of Classification Search
CPC ....................................................... B62M 3/00
See application file for complete search history.

(56) References Cited

U.S. PATENT DOCUMENTS 5,493,937 A   2/1996  Edwards
9,097,598 B2  8/2015  Grassi
9,810,593 B2  11/2017 Carrasco Vergara et al.
(Continued)

FOREIGN PATENT DOCUMENTS

CN   206218128 U    6/2017
DE   202007019291 U1  1/2012
(Continued)

*Primary Examiner* — Phuong Huynh

(57) ABSTRACT

A shaft characterized by its length to diameter ratio being less than about 1.75 having a drive connection at one end where the wall thickness of the shaft is selected to be thick enough to avoid ellipticalization strain error in torsional measurement of less than 5%. One specific application is for a crankset spindle that can be used to measure a cyclist right, left, and total leg torque.

15 Claims, 6 Drawing Sheets

(51) Int. Cl.
  *G01L 3/10*   (2006.01)
  *B62J 45/421* (2020.01)

(56) References Cited

U.S. PATENT DOCUMENTS

| | | | |
|---|---|---|---|
| 2003/0029271 A1* | 2/2003 | Shuman | B62M 3/086 |
| | | | 74/594.6 |
| 2010/0093494 A1 | 4/2010 | Smith | |
| 2011/0006760 A1 | 1/2011 | Glueck | |
| 2011/0067503 A1 | 3/2011 | Roudergues | |
| 2014/0001728 A1* | 1/2014 | Hilfiker | G01L 5/165 |
| | | | 280/259 |
| 2016/0185419 A1* | 6/2016 | Bendel | G01L 5/225 |
| | | | 180/220 |

FOREIGN PATENT DOCUMENTS

| | | |
|---|---|---|
| EP | 2998211 A1 | 1/2013 |
| EP | 2869048 A1 | 5/2015 |
| EP | 3239679 A1 | 11/2017 |
| JP | 5155000 B2 | 2/2013 |
| WO | WO2013/001698 A1 | 1/2013 |

\* cited by examiner

SHAFT MINIMIZING ELLIPTICALIZATION STRAIN ERROR

BACKGROUND

Measurement of a shaft's torque is useful in many areas, not only for measurement of torque, but if the shaft's rpm is known the shaft's power can be directly measured. To date, one of the most ubiquitous measurements of torque is by a strain grid gauge (referred to herein alternatively as "strain grid" or "strain gauge") directly applied to the shaft. In such a configuration, the power supply, data capture and reading are typically the technical issues since the shaft (axle) is turning and, therefore, measurement data has to be either recorded for later analysis, wirelessly transmitted, or received, or require slip rings for continuous hardwire transmission. External sensing technologies (e.g. optical, surface acoustic wave strain grids, etc.) are an alternative solution to this issue, but have their own issues as well. For example, one type of external technology is a magnetorestrictive material whose magnetic field is proportional to the strain present in the shaft. Torque applied to the shaft causes the magnetic field to change and this is externally detected with a fixed sensor (nonrotating such as a Hall Effect sensor) and its power supply. Likewise, another example is that of optical encoders spaced apart on the shaft, which can be used to detect a phase shift from the shaft's torsional deflection (twist), with the remaining sensing detector located external to the rotating shaft. Optical encoders and magnetorestrictive sensors typical consume more physical space. Further, magnetorestrictive require steel shafts, or magnetorestrictive material bonded to a nonmagnetic shaft. The magnet field density or field strength (needed to sense the strain) is also proportional to the quantity of magnetorestrictive material, and thus shaft lengths must be long (to increase the amount of field strength to detect changes). Magnetorestrictive sensing, including optical sensors, in comparison to other strain measurement sensors require more physical space for sensing. The advantage of these sensors is that errors due to other strains present in the shaft, such as bending strain, are minimized. Both of these technologies require a fixed sensing component. Strain grids, on the other hand, do not have these issues, and can be used with fixed or rotating sensing components. A strain grid also has as small geometric footprint. The disadvantage with a strain grid for measurement of torque is that the grid must be in a shear pattern (measurement is 45° to the shaft axis) and thus is prone to measurement of other strains, most notably, bending strains.

Most applications of torque measurement are for either engineering applications or for manufacturing applications, such as the assembly of fasteners. Torque measurement applications when electric motors are the shaft's motive means, can be measured by the voltage and current draw of the motor (automotive hybrid and electric cars for example). In the past few decades, a unique torque measurement has arisen which is the measurement of a bicyclist power. Most applications within this power measurement field do not per se measure torque directly but indirectly by measuring forces (instead of torque) applied to the crankset assembly's pedal, crank arm, or the spider/chainring. These force measurements then have to be resolved to determine the actual torque applied the crankset spindle (force× distance=crankset spindle torque). Direct measurement of torque utilizes the shaft (spindle, but not to be confused with the pedal spindle) of the bicycle crankset. Even if an electric motor is present to assist the rider, a bicyclist power cannot be measured, as the rider's power cannot be sensed by the motor, as only the power applied by the motor is measurable. The spindle is favorable for torque measurement since it not only operably connects both crankarms, but can also be operably connected to an electric motor for electric powered cycling applications. The spindle is also well protected from the environment as it is internally housed by the bicycle's bottom bracket shell, whether that bottom bracket shell is directly connected to the frame, or indirectly via the electric motor assembly housing, which in turn is operably connected to the remaining bicycle. This bottom bracket location however suffers some power measuring disadvantages.

Currently, individual left and right leg power is measured with sensors at either the crank arms or the pedals, since these locations naturally separate the forces that drive the crankset versus other locations within the crankset that measure power, such as the chain-ring/spider. At the chainring/spider, a cyclist legs' power cannot be measured individually but can only be estimated from each leg. This is because when one leg is pushing, the other leg can be simultaneously pulling or pushing and thus these forces cannot be separately resolved. With respect to spindle power measurement, if the chainring/spider is fastened to the (right side) drive arm, the spindle can only be used to measure the left leg. To resolve this, the spider can be detached from the drive side crank arm and driven by forces from each leg. An example of this type of layout is WO 2008/109914 to Smith. This patent discloses a means for driving a spider from each leg and how one might measure individual torque from each leg (right and left) with a spider/chainring on the drive side of the bike frame. Another example is U.S. Pat. No. 8,797,027 to Glueck et al. ("'027 patent"), which utilizes magnetorestrictive sensing technology and discloses means to measure the left leg and the total torque from both legs (combined torque from two shafts) when the chainring is separated from the drive side crankarm and is on the right side of the bicycle frame. Right leg torque is not directly measured, but is estimated by the difference in the two measurements. To date there appears to be no known direct measurement of right leg torque in a bicycle spindle which can individually measure torque, nor does there appear to be any direct spindle arrangements that permit direct measurement of left and right leg, or simultaneous measurement of total, left, and right torque; or of the left leg torque by subtractive measurement from directly measuring the total torque and the right leg torque.

U.S. Pat. No. 9,097,598 to Grassi ("'598 patent"), incorporated herein by reference in its entirety, shows a torque sensor including a spindle having at least one strain grid gauge mounted to the spindle in a shear pattern to measure torque. This arrangement permits the left leg torque to be measured whilst negating bending strain (the chainring is fixed to the drive crank arm). Measurement of torque on a solid shaft is known, however the '598 patent shows how measurement on or in a hollow shaft using strain gauges could be accomplished especially and specifically for a bicycle's spindle which undergoes tremendous bending loads. In fact, the bending loads can be well over 10 times the torque load when the rider is standing upright pedaling uphill.

It is an object of the present disclosure to measure torque near the end of a shaft with less than 5% error by strain measurement, preferably using a shear grid pattern. This permits torque measurement on a short shaft when torsional, bending, as well as axial loads are all present at one end of the shaft, and thus a short shaft in accord with the present disclosure can be used in many different applications aside from the exemplary examples described herein.

Another object of the present disclosure is to provide a transducer (the shaft with appropriate strain gauges) that has a linear output response with respect to the input torque.

Yet another object of the present disclosure is to provide a completely or partially hollow shaft that in combination with another shaft can be used to measure a bicycle rider's leg torque for one or more of total, right and left in a bicycle spindle. By way of example only, a bicycle spindle will therefore be used for purposes of illustration in the present disclosure, but the concepts disclosed herein are not to be construed to be limited to only bicycle spindles (shafts). Instead, the concepts disclosed herein may be applied to other spindles and shafts such as, but not limited to, human-powered vehicles (e.g., quadracycle, tricycles, trailcarts, pedal-powered boat or board, pedal-powered submersible, etc.) or powered vehicles enabling powered and/or human-driven propulsion (e.g., electric bikes, etc.).

The present exemplary embodiments provide a shaft that addresses the aforementioned needs and objects.

As employed herein, the term "sensor" means a strain grid. Strain grids can be photoelectric, metallic wire-type, semiconductor (otherwise known as piezo resistive) including diffused semiconductor strain grids, surface acoustic wave (SAW) or the like. In the art, grid is also referred to as a gauge, and thus either wording is equivalent within this disclosure. To measure torsional strain with a strain grid, the strain is measured about 45° with respect to the shaft axis. At or about 45° is to be interpreted as meaning an angle between 37-53°. By the term "transducer", the instant application means a torque body, the sensor and a wiring harness.

DETAILED DESCRIPTION

Figure 1:
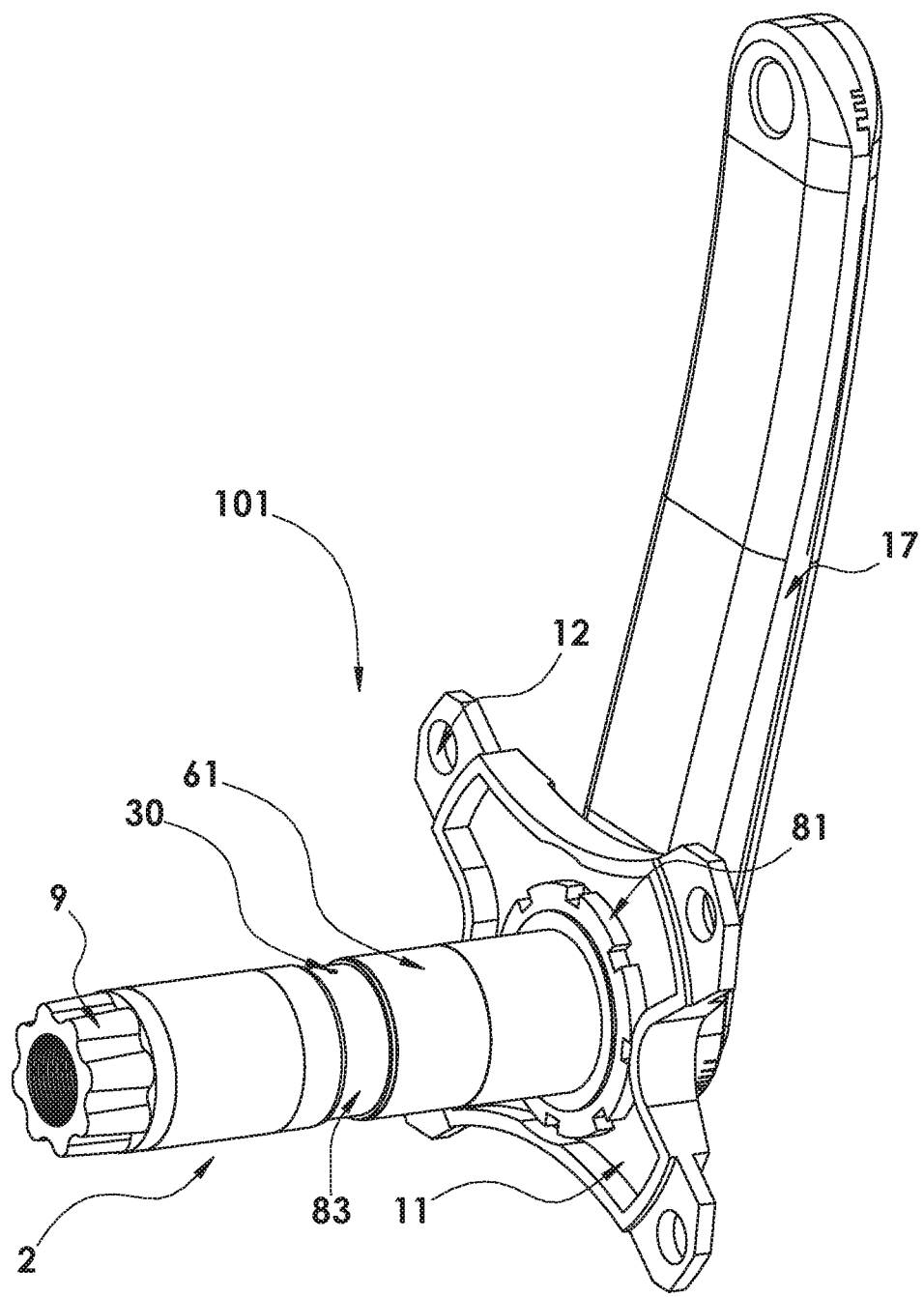
FIG. 1 is a perspective view of a portion of a torque transmitter comprising a bicycle crankset having shafts according to the present disclosure.

FIGS. 1-6 show and describe example hollow shafts (see, e.g., 60, 61 in FIG. 2 or 160, 161 in FIG. 6) having a first end portion including a first end, a body or middle portion and a second end portion including a second end. In some examples, the hollow shafts (60, 61, 160, 161) include a flange (see, e.g., 13 in FIG. 1 or 113 in FIG. 5) at one end. In some examples, the hollow shafts (60, 61, 160, 161) include a first means for transmitting torque (e.g., 7 in FIG. 2-4 or 107 in FIGS. 5-6) at the first end portion and a second means for transmitting torque (e.g., 9 in FIG. 2-4 or 109 in FIGS. 5-6) at the second end portion. The example torque transmitting means (e.g., 7, 9, 107, 109) may include, for example, splines, flutes, pins, teeth, or other conventional mechanical connectors (e.g., screws, bolts, rivets, etc.). In some examples, the torque transmitting means (e.g., 7, 9, 107, 109) may include a welded connection or an adhesive connection between mating components. The presently preferred material of construction of the hollow shaft comprises a metal (e.g., a metal alloy, stainless steel, aluminum, magnesium, titanium, etc.), although carbon fiber, graphene, or other nonmetallic material may be advantageously used in the alternative.

As determined by the present applicant, loading at an end of the hollow shaft (e.g., 61, 161), such as by crank arm (17, 117), crank arm bolting connection, or other load such as a bearing, causes the hollow shaft (61, 161) to elastically deform into an elliptical shape. When only torque loading is present, as in many conventional torque measurement applications, there is no such elliptical deformation. The issue of elliptical deformation occurs when the torque loading is simultaneously coupled to a bending load (caused by a moment), such as in the case of a torque transmitter comprising a bicycle crankset (101). In a crankset spindle (2, 102), unlike most other torque shaft applications, the torque is always coupled to a bending load since a perpendicular force is applied to an axle (shaft) by a lever arm (a moment), i.e. a "lever force." At the spindle (2, 102) bearing (6) itself (a portion of crankset (101) bottom bracket), the spindle bearing (6) must support this perpendicular force (bearing does not support torque, i.e. twisting), while the spindle (2, 102) itself must support both the force and the torque. This perpendicular force at the end of the spindle (2, 102) causes a bending load along the axis of the spindle (2, 102). Specifically, a "lever force" at the end of a lever arm produces a moment about the spindle's (2, 102) axis and a perpendicular but opposing force at the end of the spindle (2, 102) is required to counteract the "lever force." To clarify, a moment always causes a torque (about the center of gravity or pivot point). Further, a moment always causes a counteractive perpendicular force located at the spindle (2, 102) axis to counteract the "lever force" causing the torque about the pivot or center of gravity. One can see this is a completely different situation from an engine or motor shaft that produces torque without the counteractive force. This counteractive force results in a bending load in the shaft.

The present applicant has discovered that, for some torque transmitters, a loading (moment) can also cause elliptical deformation in a hollow shaft used to transmit torque when a bending load (hence a torque, as described above), or a perpendicular force to the shaft is present. For instance, in the case of the above-noted crankset (101, 201), a loading (moment) can also cause elliptical deformation in a hollow crankset spindle (2, 102) when a bending load (a torque), or a perpendicular force to the bicycle spindle (2, 102) is present.

Any type of torque measurement technology in a hollow spindle (2, 102) is thus susceptible to a torque error measurement from this elliptical deformation, especially a strain grid. That is, the elliptical deformation causes a strain that is superimposed on the 'normal' deformation from either a bending load strain or torque strain. Most important, when only a bending load is applied to the end of an associated crank arm (17, 117) (visualize the case where both the crank arm and load are aligned to each other; that is, a vertical position where the rider would be standing on the pedals, but not trying to turn the crank), the strain from this elliptical deformation near the end of a typical hollow spindle (2, 102) is not cancellable by a shear strain gauge setup having a sensor arrangement with two strain gauge grids opposed at about 180° at the end of the shaft. In this situation, the bending load causes the sensor to have an erroneous output torque measurement reading. The erroneous torque measurement reading's value can be well over 10% of the rider's load. This can be observed when a rider's load causes only a bending load without torque. When the crank arms (17, 117) are in a vertical position, the rider's load is aligned parallel with the crank arm (17, 117) and therefore produces little to no torque.

Figure 2:
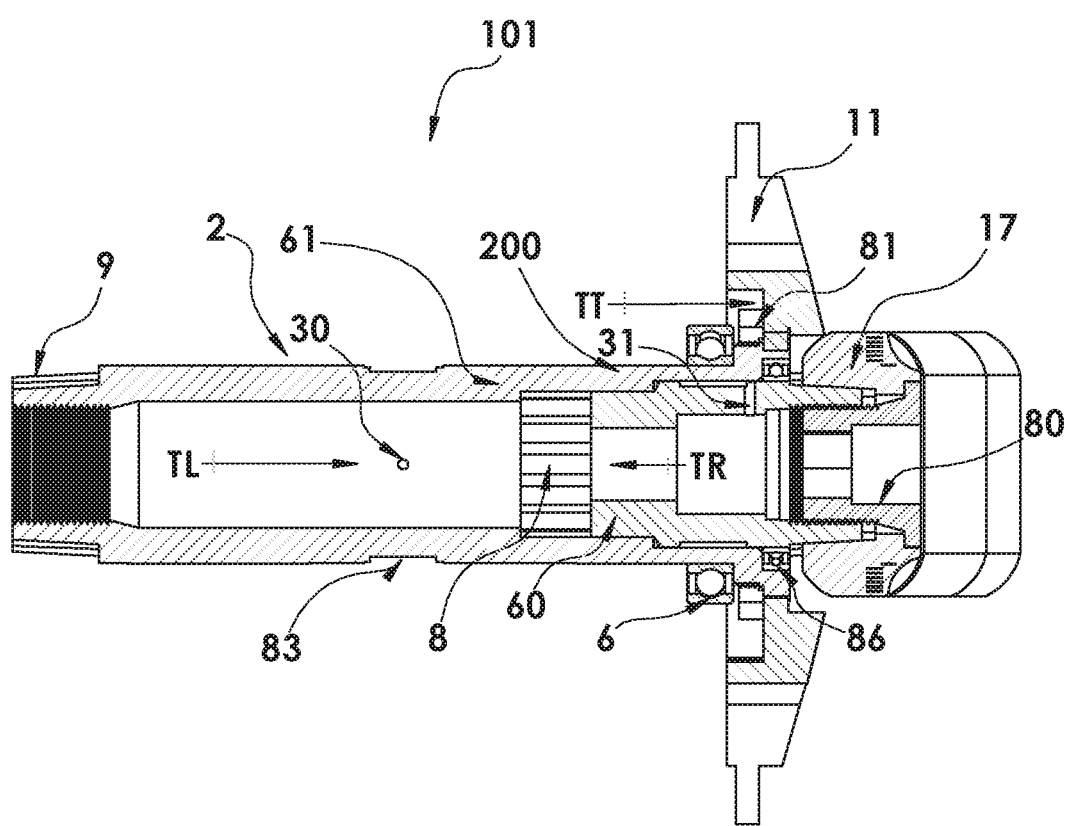
FIG. 2 is a section view the shafts comprising the torque transmitter of FIG. 1.
Figure 5:
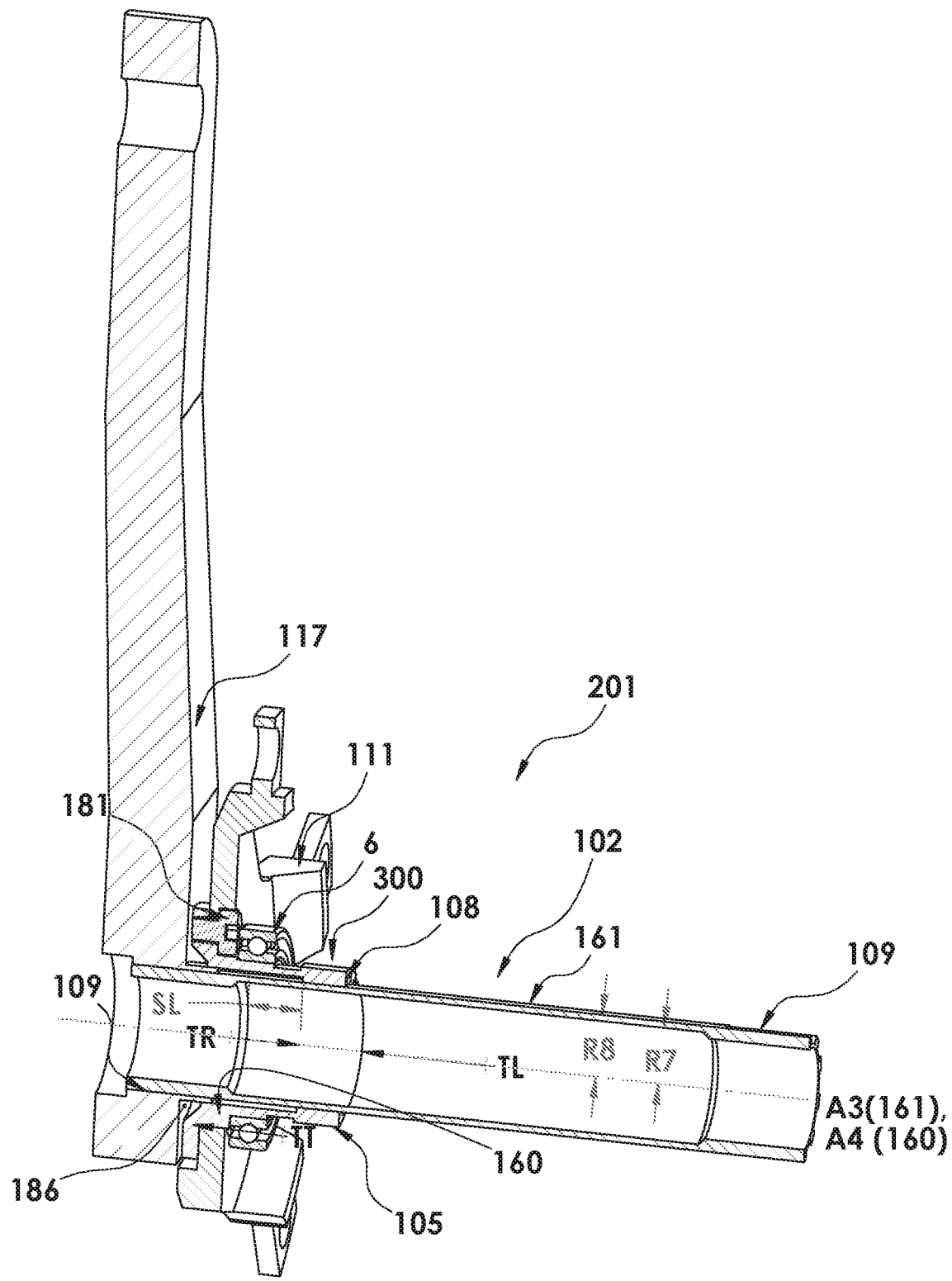
FIG. 5 is section view of a portion a torque transmitter comprising a bicycle crankset having shafts according to a second embodiment of the current disclosure.

One object of this disclosure is the provision to measure torque using, in some examples, a short hollow shaft (e.g., 60 in FIG. 2; 160 in FIG. 5) that connects to a longer hollow shaft (e.g., 61 in FIG. 2; 161 in FIG. 5). For a bicycle spindle application, this longer hollow shaft (61, 161) can comprise aluminum having an outside diameter (OD) of around 30 mm (+/−6 mm) or steel having an OD of around 24 mm (+/−2 mm), which are typical for these materials in such example application. Likewise, this disclosure can be extended to other applications and the materials and dimensions selected for such other applications. A completely solid shaft is much less susceptible to the ellipticalization which causes torque error measurement; however, another source for torque measurement error is strain error caused by nonuniform stress patterns from the end splines connected to the crank arms. Further, even a "solid" shaft for a bicycle spindle will have a "hollow portion," as most shaft ends having splines at the end of the shaft also have a hole in the shaft for bolting the crank arms to the shaft. As used herein, the terminology "hollow shaft" is to be understood to include both a completely hollow shaft defining a thin or thick-walled cylinder, as well as a partially solid shaft including a hollow portion. A strain grid located near this crank arm (17, 117) connecting area will also be susceptible to torque error measurement.

Once a strain grid is located outside the nonuniform stress area caused by the splines (9, 109) themselves, the strain error due to the ellipticalization can be reduced by increasing shaft wall thickness for a localized area, a flange (13), or a combination of the two. It has been found through experiments to determine the proper inner diameter (ID) (shaft wall thickness) of the hollow shaft (e.g., 61, 161), that the shaft's ID can be advantageously experimentally decreased (made smaller to reduce ellipticalization). The hollow shaft (61, 161) ID being determined by sensing when strain error from ellipticalization just starts to rapidly increase and which can be measured by observing torque error when only a "side force" (perpendicular force) load is applied to the shaft (to just cause a bending load without a torque load). One can characterize the outer diameter (OD) and inside diameter (ID) of the hollow shaft (61, 161) so that the OD-ID (the wall thickness) is materially strong enough to carry the designed torque needed (in a normal bicycle crankset the torque will be proportional to the "side force" load) but also sized so as to reduce torque error from ellipticalization. In mechanics, this characterization is known as the polar moment of inertia, and is to calculate a shaft's deflection and stresses from torsional loads. In the present disclosure, the maximum ID is also set by empirically testing (this can also be accomplished with computer aided modelling) the hollow shaft (61, 161) with only a "side force" load (bending load, this is the counteractive perpendicular force previously described to counter the "lever force"). The side force load is that which causes ellipticalization and which would be present when there is torque in a bicycle spindle under normal operating conditions, but for this testing; the torque is removed for testing. If the maximum ID is not adequate, it will be observed that this side force load will be seen as an error "torque" reading, which is due to deformation of the hollow shaft (61, 161) from the ellipticalization strain caused by the side force load causing bending. This is not to be confused with normal bending load which can be theoretically cancelled with two strain measurements on opposite sides of the hollow shaft (61, 161). The ellipticalization is caused by the hollow shaft (61, 161) being squeezed (pinched) due to the force at the end of the hollow shaft (61, 161) which so happens to also cause bending. In other words, the maximum ID could also be set by forces that cause squeezing with no bending present.

In accord with the present concepts and objects, the strain from ellipticalization is to be avoided or reduced. In accord with the present concepts, the partially hollow or completely hollow shaft(s) (e.g., 61, 161) of this disclosure are advantageously configured to reduce or eliminate the above-noted ellipticalization in the area(s) in which the strain gauge(s) (not shown) are disposed. The ID of the hollow shaft (61, 161) is thus determined by both the torsional and the side loads that cause elliptical deformation. That is the wall thickness of the hollow shaft (60, 61, 160, 161) must not only be strong enough to carry the designed torque load but must also be sized to reduce the elliptical deformation from the side load. Further, the determination of the shaft ID dimension is also influenced by the location of the strain gauge(s) on a shaft and, if the strain gauge is wired, the location of holes for the strain gauge wiring, the bearing location, and other manufacturing considerations. The shaft ID at the strain grid (sensor) location (see, e.g., 83, 84) can be set to zero or to a very small value while the remaining hollow shaft (60, 61, 160) is hollow. However, in practice this makes for a heavier shaft, and one more complicated to make including the prediction of the torsional strain desired to be measured (the stresses/strains are not uniform). Normally the "area moment of inertia" used for calculating stress in a shaft in bending is ½ that of the "polar area moment of inertia". However, these equations are for approximation, and are useful primarily for theoretically perfect shafts, especially long uniform shafts. In practice, the stresses and strains created by the end of the hollow shafts (60, 61, 160, 161) in this disclosure due to the loading and spline (9, 109) connections are not uniform and are somewhat difficult to model, especially in view of manufacturing tolerances on the round shaft. Thus, one may view the hollow shaft(s) (61, 161) of this disclosure, especially where the sensor (strain grid)(not shown) is located (84, 183), as having an area moment of inertia that is determined by the side load causing the elliptical deformation which is related to the bending load rather than being determined from the polar moment of inertia based on the torsional load requirements. It is to be noted that in mechanics the polar moment of inertia is twice that of the area moment of inertia for a shaft. Since the object of the disclosure is to reduce the effects of ellipticalization in the area (e.g. 84, 85, 183) of the strain gauge near the end of a shaft (60, 61, 160, 161), the "area moment of inertia" in a localized area (84, 85, 183) where the strain gauge would be located is increased by either (or in combination with) increasing the shaft wall thickness or by adding at least one flange that locally increases the area moment of inertia, even though the polar moment of inertia near the flange remains the same. Thus, a torque transmitting hollow shaft of this disclosure having less ellipticalization strain error will have an area moment of inertia that is about equivalent to the area moment of inertia if the shaft were solid or with a very thick wall, but having the same outside diameter. For purposes of this disclosure, a hollow shaft in the area of a strain grid will have an 'effective area moment of inertia' greater than that which is calculated by using an inner diameter (or inner radius) that is about 0.65-0.80 times the outer diameter of the hollow shaft (noting of course that this sets only the minimum value, as well as a minimum outside diameter for an outer flange (e.g. 15, 16, 113) as the effective area moment of inertia can be larger than a value using an inside diameter value of zero (solid shaft)). The hollow shafts (60, 61, 160, 161) of this disclosure however need not have an inner radius (R1, R3, R5, R8) that is about 0.65-0.80 times the outer radius (R2, R4, R6, R8) when a flange is located nearby the strain grid as this too effectively increases the area moment of the shaft in this localized area. The actual polar moment of inertia of the hollow shaft (60, 61, 160, 161) based on the actual inner and outer radiuses (R1-R8) can be less than the polar moment of inertia based on the "effective area moment of inertia."

As an example calculation of the effective area moment of inertia, a typical aluminum bicycle crankset spindle has an outer diameter of 30 mm and an inner diameter of about 24.75 mm when an aluminum alloy of type 6061 is used and which is based on known requirements of torsional loading for this application. For a shaft of this disclosure having an outer diameter of 30 mm in the area of a strain grid at the end of the shaft the effective area moment of inertia would be about or greater than $I=\pi/64 \ (OD^4 - 0.65(OD^4)) = \pi/64 \ (30^4 - (0.65*30)^4) = 32,663 \ mm^4$. For a minimum outer diameter of a flange to have an effective area moment of this value $I_{flange} = 32,663 \ mm^4 = \pi/64 \ (OD^4 - (24.75^4))$. Solving for OD of the flange yields a value of about 31.9 mm, which show how effectively an outer flange can be used to stiffen the end of a shaft to minimize ellipticalization.

This entire subject can be easily visualized by taking a simple plastic drinking straw and squeezing the end of the straw between their fingers. One can see the ellipticalization and where the straw remains round so as to avoid the error being caused by the ellipticalization. If it is desired to have the strain gauge (not shown closer to the end of the hollow shaft (61, 161), the shaft's ID is decreased (the wall thickness increased). Alternatively, to reduce ellipticalization, the shaft can have an internal flange (e.g., 14, 114) or external flange (e.g., 13, 16, 113) on the end of the hollow shaft (61, 161) where the bending load (squeeze) is applied, which will act in the same manner to reduce ellipticalization. That is, this is one and the same. Ellipticalization is reduced on the hollow shaft (61, 161) where there is an increased wall thickness and/or very near a flange (e.g., 13, 113) location (which also increases the wall thickness). As the distance away from the flange (e.g., 13, 113) is increased, the ellipticalization will be more pronounced and will depend generally on wall thickness. The flange (e.g., 13, 113) itself may be made part of the hollow shaft (61, 161) connection for the crank arm (17, 117), or the spider (11, 111) and, thus, serve multiple purposes. In all cases, either internal or external to, but near the flange (e.g., 13, 113), there is less ellipticalization caused by a bending load (perpendicular force). For example, a "flange type spline" connection for the crank arm (17, 117) that is larger than the driven hollow shaft (e.g., 61, 161) therefrom will reduce the effect of ellipticalization near the flange (e.g., 13, 113). The ID of the hollow shaft (60, 61, 160, 161) at or near the strain measurement location (83, 84, 85, 183) is thus set where the error from the ellipticalization will not be excessive. For purpose of this disclosure the strain error from ellipticalization being no more than at or about 5% or less of the torque strain, the torque strain being from a force applied to a lever arm to the shaft causing a torsional strain in the shaft. In some examples, one or more pairs of strain grids are provided, each pair of strain grids being disposed in the area (83, 84, 85, 183) of the hollow shaft (e.g., 61, 161) at or about 180° radially apart, and used to set the hollow shaft (e.g., 60, 61, 160, 161) ID to achieve a torsional error less than 5%. Typically, more strain measurements also tend to lower effect of ellipticalization torsional measurement error. Therefore, the hollow shaft (e.g., 60, 61, 160, 161) ID at the sensor (e.g., strain grid) measurement location, 83, 84, 85, 183) can be further decreased by using more than just two strain grids (for example, four strain grids spaced radially apart every 90°, etc.). That is, a thinner hollow shaft (e.g., 61, 161) wall is possible with more pairs of strain grids than with less. Alternatively, the opposite is also possible, that is to minimize the number of strain grid locations, a thicker wall; a flange; or, a thicker wall combined with a flange can be used. For example, it is now possible to minimize the sensor measurement location (83, 84, 85, 183) to just a single position (one spot) on the shaft having a single sensor (e.g., strain gauge) having two strain grids (a half bridge) or four strain grids (full bridge) by minimizing the ellipticalization effect. However, bending strain must also be reduced, or removed, or made constant, but the hollow shaft (e.g., 60, 160) of this disclosure having the effect of ellipticalization reduced has the added benefit of permitting shaft arrangements that permit a single sensor (e.g., strain gauge) location (e.g., 84, 183). It is known that bending loads in the spindle (e.g., 2, 102) are the highest in the middle of the spindle (2, 102) and theoretically are zero at the end of the hollow shaft (61, 161). Thus, by removing the ellipticalization strain error, it now possible to locate the torsional strain measurement in a shaft area that has the lower bending strain. In accord with the present disclosure, it is now possible to construct a torsional shaft that is short with respect to its outside diameter (e.g. 60,160).

Yet another advantage of this disclosure is that the spindle (2, 102) may comprise a first hollow shaft (60, 160) operatively associated with a second hollow shaft (61, 161), wherein the first and second hollow shafts (60, 61, 160, 161) are mechanically arranged so that the first hollow shaft (60, 160) will have very low bending strain, the bending load predominantly being taken by the second hollow shaft (61, 161). The strain grids (not shown) in the half or full bridge for a single location (84, 183) described above are in a shear pattern where the strain grids (not shown) are each about 45° (e.g., between about 37-53°) to an axis, and with respect to each other. That is, the strain grids are at a positive and negative angle with respect to the shaft axis so that one strain grid is measuring positive strain from torsion whilst the second strain grid is measuring negative strain from torsion (in appearance the grids form a pattern that appear as a chevron or a "V pattern" for two strain grids, otherwise also known as a half bridge shear pattern, and two inverted chevrons or an "X pattern" for four strain grids, often referred to in the industry as a full bridge shear pattern), and the strain grids are measuring bending, which is either both positive or both negative (same sign), but which can be connectable to a circuit (not shown), such as a circuit external to the spindle (2, 102), that permits torsion strain and bending strain to be measured where the strain is converted to an electric signal such as a voltage or current that is proportional to the torque in the shaft. For example, the circuit can include a Wheatstone Bridge, such as is shown and described by way of example in applicant's '598 patent incorporated herein by reference in its entirety, which illustrates an example circuit where bending strains in the hollow shaft (e.g., 161) measured by the strain grids (not shown) would result in subtractive voltages in the Wheatstone Bridge arrangement and torsional strains in the hollow shaft (e.g. 161) measured by the strain grids result in additive voltages to provide, as strain data, an output voltage from the circuit that is proportional to torque.

As just described with the minimization/removal of ellipticalization strain and with proper location of the torsional strain measurement (to also minimize the bending strain), multiple strain grids (sensors) can now be located on the hollow shaft (60, 61, 160, 161) even though a single strain gauge location may be optimum for most applications. By removing or significantly attenuating ellipticalization strain (as well as bending strain) in accord with the present concepts, a vast array of strain measurement locations are now possible to minimize wiring and improve manufacturability, since a pair of strain grids (sensors) need not be opposed at 180°.

In many instances, however, to assure the best torsional measurement, the preferable sensor location for strain grids is to use a pair of strain grids where each strain grid is at a separate location on the hollow shaft (60, 61, 160, 161), the locations being radially apart by about 180 degrees (i.e., between about 165-195°). The location of each strain grid of the pair along the axis is preferably about the same distance with respect to the end of the hollow shaft (60, 61, 160, 161). About the same distance means that the bending strain can be cancelled by the two strain grids, therefore the strain grids need not be exactly the same distance from the end of the hollow shaft (61, 161) but within plus or minus the width of the strain grid. When the strain grids are located at about 180° apart, the torque strain is the same sign, but the bending strain (if present) is of the opposite sign. That is, the pair of strain grids commonly shares the same 45 degree angle with respect to axis of the hollow shaft (61, 161). Additional pairs of strain grids can be added. When other pairs of strain grids are added the torsional strain measurement can be either the same or the opposite as the first pair, depending on the strain measurement circuit used. For example, if the strain grids are to be connected in a Wheatstone Bridge arrangement, the first pair and the second pair of strain grids will be positioned to measure opposite torsional strain, that is, if the first pair of strain grids are placed at positive 45° to the shaft axis to measure positive torsional strain, the second pair of strain grids are placed at negative 45° to the shaft axis to measure negative torsional strain.

For instance, if a 445 Newton force is applied at the pedal of a horizontal crank arm that is 175 mm long, the torque reading is 77.84 Nm 5% of this torsional reading is 3.89 Nm, thus, removing the crank arm (or placing the crank arm in a vertical position with a load parallel to the crankarm) and now applying a 445 Newton force to the end of the shaft (or end of the crankarm), the output from the "torque" measurement needs to be less than +/−3.9 Nm to achieve a torque reading of 5% accuracy.

Excluding the shaft end where the connection to either the spider (11, 111) or crankarm (17, 117) would physically reside, the hollow shaft (60, 160) length can be characterized by its outside diameter, and for purposes of this disclosure, the hollow shaft (60, 1601) length to outside diameter SL/OD is less than about 1.75. As will be shown, in the case when two hollow shafts (60, 61, and 160, 161) are combined to form a "crankset spindle" (a portion of one shaft overlaps another shaft), SL is the length of where the shafts (60, 61, and 160, 161) overlap (not the entire length of the shaft). In most instances this will effectively be the length of the shorter of the two shafts (60, 160). Here again, this excludes the shaft end (60, 61, 160, 161) connecting to a crankarm (17, 117) or spider (11, 111). Described below are two example configurations of a shaft (using a bicycle spindle for example) where one end can be directly connected to and torque an associated crank arm (17, 117) or spider (11, 111) (chainring). For other applications that are not bicycle related, similar functional equivalent constructs will be obvious to those skilled in the art. The disclosure shows example shafts (60, 61, 160, 161) that are partially or entirely hollow and that conform to the above descriptions.

FIG. 1 is a perspective view of a portion of a torque transmitter comprising a bicycle crankset (101), the bicycle crankset (101) including a right crankarm (17) connected to a spindle (2) with a crankset bolt (80) (shown in FIG. 2). A spider (11), a multi-armed component that connects the chainring to the bottom bracket axle, is shown to be removably connected to the spindle (2), sans chainring, with a lock-ring fastener (81). Other means for a removable connection such a snapring, bolts, etc. can also be used. The lock-ring fastener (81) can be located to the right side of the spider, or on the left side of the spider, as is shown in FIG. 1. Chainrings can be bolted to the spider (11) at spider chainring holes (12). A left crank arm (17) is also not shown, however the splines (9) for the connection are shown on the left of the spindle (2). In all the embodiments shown, the spider (11) is not driven directly by the right crankarm (17) but by second shaft (61). As will be further described in FIG. 2, a region for measuring torsional strain from the left leg torque is shown as a recessed surface region (83). In region (83), sensors for measuring the torque strain from the left leg torque would be mounted as described and shown in '598 to Grassi. Hole (30) is shown to facilitate strain grid wiring to the internal cavity of shaft (61) if the strain grid is not of the surface acoustic wave type, and needs wired to an internal strain measuring circuit located within second shaft (61).

FIG. 2 shows a section view of FIG. 1 revealing more detail of the crankset (101), and spindle (2) forming a part of the torque transmitter. Spindle (2) is comprised of a first shaft (60) internal to a second shaft (61), where the first shaft (60) is connected to the right crankarm (17) by the crankset bolt (80) and the first shaft (60) is internally connected to the second shaft (61) by drive connection (200), shown as splines for transmitting torque from and to each of shafts (60) and (61). Visible in FIG. 2 are second shaft splines (8), which mate with first shaft splines (5), shown in FIG. 3. As being shown, shaft (60) and (61) are axially connected by press fit. Alternative methods as gluing, welding, circlips, or mechanical connectors may be used. Drive connection (200) may also use teeth, dowel pins, or other means for transmitting torque. Generically this drive connection (200) is for torque transmitting means. A bearing (6) is also shown. Bearing (6) is the normal bottom bracket bearing. Although not required, a bearing (86) is also shown which is between second shaft (61) and first shaft (60). The bearing (86) is shown to indicate that the first shaft (60) can move (micro movement due to torsional strain causing twisting) with respect to the second shaft (61) at this location. Lock-ring fastener (81) is also shown that fastens the spider (11) to the spindle (2) or second shaft (61). One can see that if a force is applied to the end of the right crankarm (17), that the torque (from a cyclist right leg) is transmitted to first shaft (60) and that this first shaft (60) drives second shaft (61) via the drive connection (200), which in turn drives spider (11) which then drives change rings connected to the spider (11). Spider (11) as shown could be replaced with a one piece spider combined with chainring (like those used in cyclocross). TR represents the torque to the shaft from the right leg. TL represents the torque to the second shaft (61) from the left leg. At drive connection (200) the torque from both the left and right leg combine and TT represents the total torque from both legs that drive the spider. One cannot separate the torque in drive connection (200) to individually measure each leg torque. Measurements on the inner diameter (and outer if provision is made for wiring and protecting the strain gauge) of the second shaft (61) where the second shaft overlaps first shaft (60) up to the spider connection and the end of the second shaft (61) are acceptable torsional strain measurements locations of TT. There are thus two distinct areas/regions on second shaft (61) for torque measurements. According to '598 to Grassi left leg torque can also be measured. As one example, a recessed surface region (83) on second shaft (61) is shown where torque from the left leg can be measured leaving clearance for the gauges and the wiring. A wiring hole (30) not visible in this cross sectional view is also shown in FIG. 1 so that strain grid gauge wiring may pass through the spindle to the inner cavity where associated electronics can be housed. While possible to avoid holes by mounting strain gauges on the inner diameter of the spindle to measure TL, in practice this method is more difficult than mounting to the outer diameter. Hole (30) can be made on the order of 2.5 mm in diameter or less, and the second shaft (61) wall thickness can be increased so as to avoid concentrated stresses. The arrangement between first shaft (60) and second shaft (61) helps to create uniform strain and prevent ellipticalization from the drive connection (200). If second shaft (61) and first shaft (60) are not welded, bonded or an interference fit not used, it is preferable to have a quantity of six or more of splines, dowel pins, teeth, flutes, (torque transmitting means drive connection (200) to avoid concentrated stress (strain) and to minimize ellipticalization.

Figure 3:
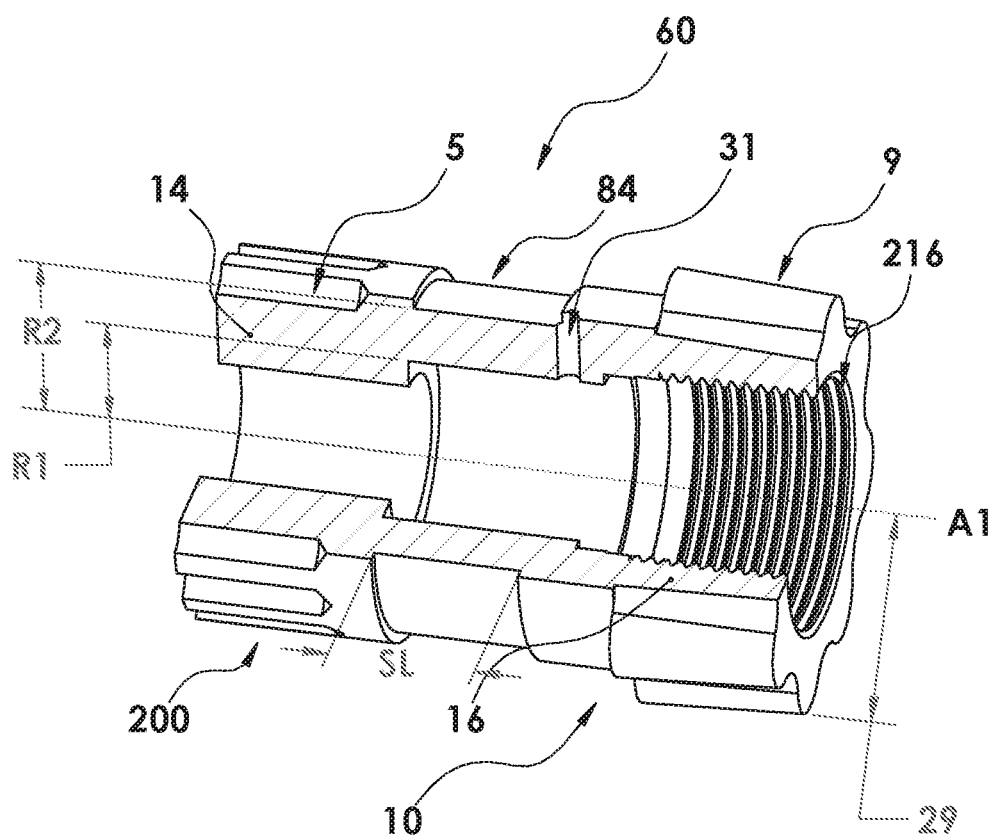
FIG. 3 is a section view of the first shaft view of the present disclosure shown in FIG. 2.

FIG. 3 shows first shaft (60) of FIG. 2 exemplifying this disclosure. Region (84) is here shown as being recessed and is an area that a strain grid arrangement for measuring torque can be located as previously described. This area has an inner radius R1 and outer radius R2 (OD=2×R2) having a shaft length SL as has been previously characterized, one side of which immediately joins to region (200), the shaft's (60) drive connection at one end of the shaft, while the second side immediately joins to region (10), the second end of the shaft where the splines (9) connect to an associated crank arm (17) and can be permanently fastened, or as shown, mechanically fastened by threads (216) and crankset bolt (80) shown in FIG. 2. As can be seen by axis A1, the effective spline diameter (29) is larger than OD and thus also forms a flange (16). The same is shown for region (200), but in reverse, the wall thickness is much greater and forms internal flange (14). The first shaft's (60) overall length can be made about one fourth or less the overall spindle (2) length, thus not only minimizing extra weight, but which reduces torsional twist introduced by adding an additional shaft to a spindle and promotes a simpler shaft to manufacture. An optional hole (31) is also shown near region (84) and region (10) so that strain grid wiring can pass to through and into hollow first shaft (60).

Figure 4:
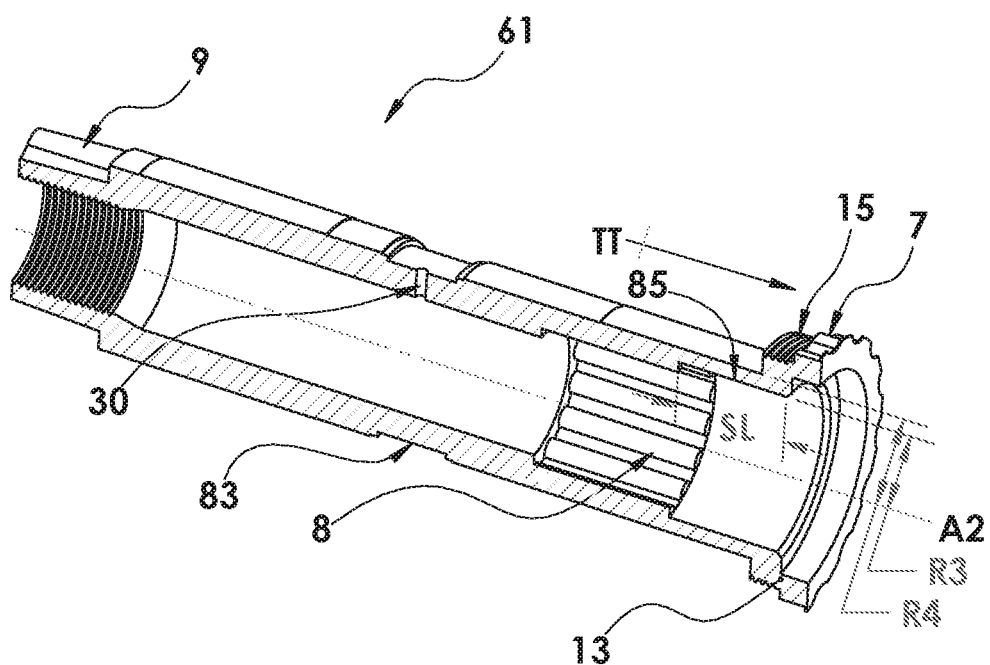
FIG. 4 is section view of the second shaft according to the present disclosure shown in FIGS. 1 and 2.

FIG. 4 shows a sectional view of second shaft (61) of FIG. 1 and FIG. 2, but second shaft (61) comprises a short length of shaft SL that overlaps the first shaft (60) of FIG. 3 where TT, the total torque from both legs, is transmitted to a flange area (13) comprising spider teeth (7) for driving associated spider (11) shown in FIG. 1; and threads (15), for an associated lock-ring (81) shown in FIG. 1. The internal diameter (proportionally shown by radius R3) second shaft (61) in region (85) can house strain grids for measuring total torque TT. Preferably the strain grid gauge arrangement would be for measuring torsional shear as previously described. Alternatively, the strain grids can be placed on the outside diameter (proportionally shown by radius R4) in the same region (85) for measuring total torque TT. This configuration, as well as first shaft (60) shown in FIG. 3, both minimize the ellipticalization previously described that causes torsional measurement error by introducing a flange, here shown as flange (13). Other flange configurations would be obvious to those skilled in the art. For example, the spider teeth (7) and threads (15) can be axially reversed to that what is shown. Axis A2 is for reference purposes only. It is to be noted that region (83) as well as hole (30) can be eliminated altogether if only total torque measurement TT is made. Further, if left and right leg torque are desired to be read, the left torque TL can be mathematical inferred by subtracting the right leg torque TR obtained by measurement on the first shaft (60) from the total torque measurement TT obtained by measurement on the second shaft (61). This then removes the need for left torque measurement and the features in the second shaft (61) needed for associated strain grids (sensor). This permits a lighter second shaft (61) that has a wall thickness (=R4−R3) predominately throughout the length of the shaft. This would also help in manufacturing the internal splines (8) since machine broaching blind holes are more expensive.

FIGS. 1 through 2 shows that a first shaft (60) internal and overlapped by a second shaft (61) can measure torques adjacent to the right crankarm (17) and spider (11), which are not as susceptible to torque measurement error from ellipticalization. Next will be shown a first shaft (160) that is external to a second shaft (161) that can be torqued by a spline type connection at both ends which is also not as susceptible to ellipticalization but which is also less prone to bending loads.

FIG. 5 shows a cross section of a portion of an example torque transmitter in the form of a crankset (201) that is similar to that shown in FIG. 2 for crankset (101). Similarly, a right crankarm (117) is fastened to a spindle (102). A second shaft (161) as shown has an outside diameter of about 24 mm+/−2 mm (shown by its radius (R8) with respect to axis A3 of second shaft (161)). Of note is that the second shaft (161) is susceptible to ellipticalization where a first shaft (160) overlaps the second shaft (161) if the wall thickness of second shaft (161) is about 1 mm, shown by the difference between radius R8 and the inner wall radius (R7) (this is on par with a shaft within the bicycle industry). The difference in FIG. 5 spindle (102) embodiment versus that shown in FIG. 2 is that the first shaft (160) is now external to the second shaft (161). With respect to this disclosure however, the first shaft (160) is torqued at each end and less susceptible to ellipticalization. Further, the arrangement as shown helps to eliminate bending loads when the spindle (102) is torqued by a lever force from the crankarms (117). In the embodiment of FIG. 5, the second shaft (161) has ends having splines (109) for operatively connecting to crank arms (117). The right crank arm (117) is shown permanently connected to second shaft (161), but may also be removably connected with a fastener (80) like that shown in FIG. 2. A spider (111) or chainring/spider can be connected to the spindle (102) by fasteners (181) or other fastening means such as by a lock-ring (81) shown in FIG. 1. A bearing (6) is also removable, but is shown to indicate where a bottom bracket support would be located in this embodiment. The second shaft (161) and first shaft (160) are splined together by splines (105) on the first shaft (160) and mating splines (108) on the second shaft (161). A bearing (as previously stated in the first embodiment is not required and is not shown, but the location (186) is marked) can be used between the two shafts (160,161) to support bending loads and to allow relative micro twisting motion between the first shaft (160) and second shaft (161). Total torque TT from the rider can be measured either on the outside or inside of first shaft (160) in region SL. As shown, the outside diameter of the first shaft (160) is 30 mm with respect its axis A3 (which is coincident with second shaft (161) axis A3) but can be sized larger or smaller to fit the industry standards. In some cases, the shaft (160) outside diameter can be as large as 35 mm, and as small as 18 mm+/−2 mm while the second shaft would be appropriately sized for these sizes. Secondary shaft (161) is shown being completely hollow, however to eliminate ellipticalization in the overlap area of SL the local wall thickness of the secondary shaft can be increased and even made solid as has been previously described. This then permits a measurement of TR that is less prone to torque error from strain ellipticalization. Though no specific region is shown on second shaft (161), left leg torque can be measured as shown and described in '598 to Grassi. FIG. 5's embodiment permits a configuration where little bending and little to no ellipticalization strain occurs in the first shaft (160) in region indicated by SL, and thus as previously described, a single sensor (such as a single strain gauge having four strain grids in a shear pattern X) can be used to measure torsional strain.

Second shaft (161) is shown as being the full length of the spindle (102). Campagnolo, Specialized and others have utilized a two-piece spindle where a Hirth joint is used to connect the two spindle halves. FIG. 5's embodiment is well suited for such a configuration if shaft (161) is split, and a female and male Hirth joint is added to each half. In particular the preferred arrangement would be where the female connection of the Hirth joint would reside with half spindle (102) having the first shaft (160). Such a configuration would have the added benefit of being able to measure the left leg torque indirectly by making a total torque measurement TT from first shaft (160) and subtracting a right leg torque TR measurement on the split second shaft (161) so that all the associated sensing components can be housed on this half of the spindle (102).

Figure 6:
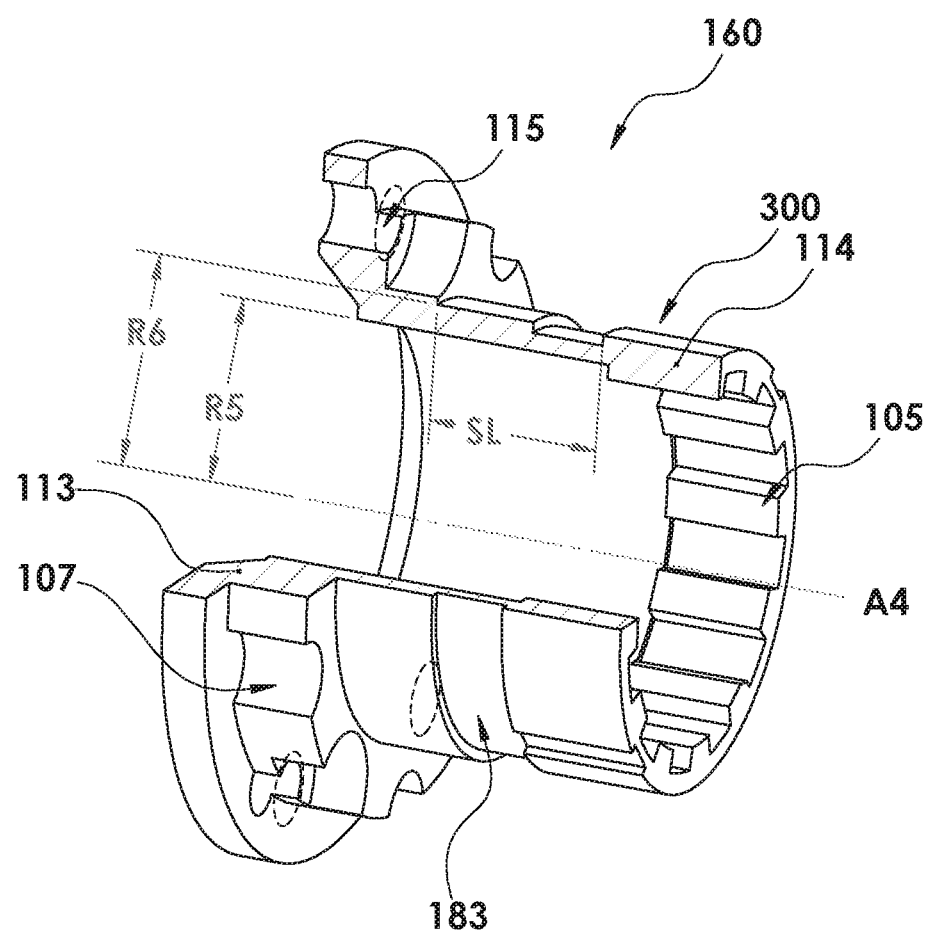
FIG. 6 is a perspective section view of the first shaft of the present disclosure according to FIG. 5.

FIG. 6 shows the first shaft (160) of FIG. 5 in a partial section view. Of note is a flange (113) on one side and a flange (114) on the other side of first hollow shaft (160) which minimize strain from ellipticalization. Strain grids (not shown) for measuring torsion strain can be located on the outer part of first hollow shaft (160) in region (183) at a smaller radius than R6 so as to protect strain grids, as well at the inner radius R5 in the area marked SL, the shaft length (SL). Radiuses R5 and R6 are shown with respect to axis A4. More clearly shown are splines (105) that mate with splines (108) of the secondary shaft (161) for transmission of torque between the two hollow shafts (160, 161) at the shaft connection (300). Torque is transmitted to the spider (not shown) by spider teeth (107) on flange (113) similar to that shown by spider teeth (7) in FIG. 4. Also more clearly shown are female threads (115) (shown by dashed circle) in the flange for fastening the spider/chainring to the first shaft (160) using a fastener (181) shown in FIG. 5. FIG. 5 configuration exemplifies that a spider can be connected in alternative ways to a shaft of this disclosure. FIG. 5 uses a screw type fastener versus a lock-ring of FIG. 1 and both designs function to removably or permanently attach a spider (11, 111) or chainring to a shaft. Other means for securely fastening the spider (11, 111) to the hollow shaft (60, 61, 160, 161) of this disclosure are also included within the scope of the claims. For example, a spring type washer and circlip could also be used.

The hollow shafts (60, 61, 160, 161) of this disclosure can have multiple regions of different shaft diameters, examples of which have been depicted in FIGS. 1-6. As discussed in relation to FIG. 2 and FIG. 5, regions marked by TR (right), TL (left), and TT (total) indicate right, left, and total torque. In the shaft connection areas (200), and (300) of FIG. 2 and FIG. 5, respectively, left and right torques combine. To elaborate that which was described above, the first hollow shaft (60, 160) can now be used in accord with the present disclosure to measure torsional strain with many different strain grid arrangements. Thus the first hollow shaft (60, 160) torque strain can be measured with a pair of strain gauge grids mounted to the first hollow shaft (60, 160) at a positive angle or at negative angle of between about 37-53° from an axis (A1, A4) of the first hollow shaft (60, 160) to measure shear strain in a direction perpendicular to a radius of (R1, R2, R5, R6) of the first hollow shaft (60, 160), the pair of strain gauge grids including a first strain grid oriented at a first angle of between about 37-53° from an axis (A1, A4) of the first hollow shaft (60, 160) and including a second strain grid oriented at a second angle of between about 37-53° from an axis (A1, A4) of the first hollow shaft (60, 160), wherein the first angle may be a positive angle or a negative angle from the axis (A1, A4) of the first hollow shaft (60, 160) and the second angle may be a positive angle or a negative angle from the axis (A1, A4) of the first hollow shaft (60, 160), the pair of strain grids, being connectable to (or electrically connectable to) or communicating with a strain measuring circuit which will generate a signal (e.g. either a voltage, a current, electromagnetic, digital, etc.) proportional to the torque in the shaft. A strain measuring circuit such as a Wheatstone Bridge arrangement can be used where the bending strains in the first hollow shaft (60,160) measured by the strain grids result in subtractive voltages in Wheatstone bridge arrangement and torsional strain in the first hollow shaft (60, 160) result in additive voltages to provide as strain data, an output voltage proportional to the torque in the first hollow shaft (60,160). In some configurations, especially that shown in FIG. 2, it is preferred that the strain grids should be radially oriented at about 180°, and the grids of the pair should share the common angle of 45° when they are radially oriented at about 180°, that is if the first strain grid is at a positive angle of 45° then the second strain grid is at a positive angle of 45° as well so as to further cancel bending loads. It goes without saying that the same strain measurement and strain measuring circuit can be applied to the second hollow shaft (61, 161).

The embodiments have thus far described how a shaft minimizing ellipticalization strain error can be constructed in different configurations using a bicycle application as an example to show that a first shaft can be collinearly located with, within, or external to another second shaft. In particular, a bicycle spindle can be constructed using the first and second shafts shown in this disclosure to permit torque measurement of the total torque and the right leg torque as well as the possibility of still measuring left leg torque as described in '598 to Grassi. This disclosure describes means for measuring torque on a shaft shorter than has been previously possible. Other torque measuring applications other than a bicycle crankset spindle will be obvious to those in the field of torque transmission and are included within the scope of the claims.

What is claimed is:
1. A first shaft for a torque transmitter, the first shaft having first end portion, a middle portion, and a second end portion, the first shaft being characterized in that:

at least one end portion of the first shaft includes a flange as a drive connection to transmit torque to an associated torqued object, the first shaft's length to outside diameter ratio is less than 1.75, the first shaft's effective area moment of inertia is sufficient to carry a torque and a perpendicular force applied to at least one of the two end portions of the first shaft, and the first shaft's wall thickness is sized, at a location of the middle portion of the first shaft of strain measurement to constrain ellipticalization deformation arising from a perpendicular force applied to at least one of the two end portions of the first shaft and yield an error in torque strain measurement of less than about 5% when torsional strain is measured by a strain sensor disposed on the first shaft.

2. The first shaft of claim 1, wherein the first shaft comprises titanium, iron alloy, aluminum alloy, magnesium, carbon fiber, or graphene.

3. The first shaft of claim 1, wherein the first shaft is partially hollow and the flange is an internal flange.

4. The first shaft of claim 1, wherein the flange includes at least one of teeth, spline, flute, or a dowel pin to transmit torque to a second shaft.

5. The first shaft of claim 1, having a second flange where the second flange has a threaded connection to mechanically couple the first shaft to a spider, a chainring, or a crankarm.

6. The first shaft of claim 1, wherein the first shaft includes a second portion having an outer radius smaller than the inner radius of a first portion of the second shaft so that the second portion of the first shaft is insertable within and connectable with the first portion of the second shaft to form a crankset spindle configured to transmit torque from the drive connection to the second shaft.

7. The first shaft according to claim 1, wherein the first shaft includes a second portion having an inside radius greater than an outside radius of a first portion of a second shaft so that the second portion of the first shaft is insertable within and connectable with the first portion of the second shaft to form a crankset spindle configured to transmit torque from the drive connection to the second shaft.

8. A crankset spindle characterized by:

a first shaft having first end portion, a middle portion, and a second end portion, at least one end portion of the first shaft including a flange as a drive connection and the other of the end portions including a means to transmit torque to an associated torqued object, the first shaft's length to outside diameter ratio is less than 1.75, the first shaft's effective area moment of inertia being sufficient to carry a torque and a perpendicular force applied to at least one of the two end portions of the first shaft, and the first shaft's wall thickness is sized, at a location of the middle portion of the first shaft of strain measurement to constrain ellipticalization deformation arising from a perpendicular force applied to at least one of the two end portions of the first shaft and yield an error in torque strain measurement of less than about 5% when torsional strain is measured by a strain sensor disposed on the first shaft; and a second shaft mechanically connected to the first shaft to transmit torque from the drive connection of the first shaft to the second shaft.

9. The crankset spindle according to claim 8, wherein the first shaft has an overall length that is less than ⅓ the length of the crankset spindle.

10. The crankset spindle according to claim 8, wherein the drive connection has includes a plurality of teeth, splines, flutes, or dowel pins to transmit torque between the first shaft and the second shaft.

11. The crankset spindle according to claim 8, further comprising a strain grid disposed on the first shaft to measure torque strain.

12. The crankset spindle according to claim 8, further comprising a strain grid disposed on the second shaft to measure torque strain.

13. The crankset spindle according to claim 8, further comprising a hole having a diameter of less than 2.5 mm passing from the outer diameter of the first shaft to the inner diameter of the first shaft.

14. The crankset spindle according to claim 8, wherein an inner radius of at least one of the first shaft or the second shaft is between 0.65-0.80 times an outer radius of the corresponding one of the at least one of the first shaft or the second shaft.

15. The crankset spindle according to claim 8, further comprising a pair of strain gauge grids mounted to the first shaft at a positive angle or at negative angle of between about 37-53° from an axis of the first shaft to measure shear strain in a direction perpendicular to a radius of the first shaft, the pair of strain gauge grids including a first strain grid oriented at a first angle of between about 37-53° from an axis of the first shaft and including a second strain grid oriented at a second angle of between about 37-53° from an axis of the first shaft, wherein the first angle may be a positive angle or a negative angle from the axis of the first shaft and the second angle may be a positive angle or a negative angle from the axis of the first shaft, the pair of strain grids, being electrically connectable to a strain measuring circuit so that bending strains in the first shaft measured by the strain grids result in subtractive electric signals in the strain measuring circuit and torsional strain in the first shaft result in additive electric signals to provide as strain data, an output electric signal proportional to torque.

* * * * *